United States Patent
Nishimura et al.

[11] Patent Number: 6,141,395
[45] Date of Patent: Oct. 31, 2000

[54] SEALED NEUTRON TUBE

[75] Inventors: Kazuya Nishimura; Michio Kato; Yuko Rintsu, all of Tokyo; Masaaki Nagakura; Yoshinobu Miyake, both of Saitama, all of Japan

[73] Assignee: Japan National Oil Corporation, Tokyo, Japan

[21] Appl. No.: 09/260,058

[22] Filed: Mar. 2, 1999

[30] Foreign Application Priority Data

Nov. 25, 1998 [JP] Japan .................................. 10-334217

[51] Int. Cl.[7] .............................. G21B 1/00; G01T 1/167
[52] U.S. Cl. ...................... 376/114; 376/108; 376/116; 250/301
[58] Field of Search .................... 376/108, 114, 376/116; 250/301, 302, 303

[56] References Cited

U.S. PATENT DOCUMENTS

| | | | |
|---|---|---|---|
| 2,973,444 | 2/1961 | Dewan ..................... | 376/114 |
| 3,546,512 | 12/1970 | Frentrop .................... | 313/61 |
| 3,581,093 | 5/1971 | Carr ......................... | 250/84.5 |
| 3,775,216 | 11/1973 | Frentrop .................... | 156/293 |
| 3,836,785 | 9/1974 | Reifenschweiler ....... | 250/501 |
| 4,310,765 | 1/1982 | Givens ..................... | 250/493 |
| 4,675,145 | 6/1987 | Kuswa et al. ............ | 376/108 |
| 4,935,194 | 6/1990 | Verschoore ............... | 376/108 |
| 4,996,017 | 2/1991 | Ethridge ................... | 376/116 |
| 5,215,703 | 6/1993 | Bernardet ................. | 376/114 |

FOREIGN PATENT DOCUMENTS

| | | |
|---|---|---|
| 1425205 | 2/1965 | France ..................... 376/114 |
| 1-312500 | 12/1989 | Japan . |
| 1190991 | 5/1970 | United Kingdom . |

OTHER PUBLICATIONS

Reifenschweiler, "Neutrons from Small Tubes", Nucleonics, vol. 18, No. 12, Dec. 1960, pp. 69–76.
Reifenschweiler, "Sealed–off Neutron Tube: The Underlying Research Work". Philips Research Reports, vol. 16, No. 5, Oct. 1961, pp. 401–419.

*Primary Examiner*—Charles T. Jordan
*Assistant Examiner*—Jack Keith
*Attorney, Agent, or Firm*—Wenderoth, Lind & Ponack, L.L.P.

[57] ABSTRACT

A sealed neutron tube is provided, in which an insulating structure is designed to be solid to enhance the shock-proof performance thereof, an ion beam drawn out from an ion source is pulsated more rapidly, and the lifetime of a target is increased without substantially increasing the filling amount of the Tritium. The sealed neutron tube (1) includes a metal housing (20), an ion source (5) disposed and sealed within the metal housing for ionizing a Deuterium gas, an accelerating electrode (4) charged with a high voltage, disposed and sealed within the metal housing and facing the ion source, and a target (3) disposed within the accelerating electrode and absorbing Tritium and the like therein. An outer wall (20) is constructed by a metal housing, and a ceramic insulating member (11) is disposed within the metal housing. Since the accelerating electrode is held by this insulating member, the outer wall of the sealed neutron tube has enhanced shock-proof performance. Further, a permanent magnet (10) is disposed within the accelerating electrode, so as to form a magnetic potential (a lateral magnetic potential) between the target and the inlet of the accelerating electrode. Consequently, the track of secondary electrons emitted from the target is bent, and therefore the secondary electrons are prevented from leaking outside of the accelerating electrode.

9 Claims, 7 Drawing Sheets

SEALED NEUTRON TUBE

BACKGROUND OF THE INVENTION

1. Field of the Invention

The present invention relates to a structure for a sealed neutron tube generating fast neutrons used in measurements, such as oil well logging and the like, and in particular to a high voltage insulating structure, an ion source structure and a target structure of the sealed neutron tube.

2. Description of the Related Art

A high voltage insulating structure, an ion source structure and a target structure of a sealed neutron tube generating fast neutrons which is used in measurements, such as oil well logging and the like, will be described with reference to FIGS. 4 to 8.

Figure 4:
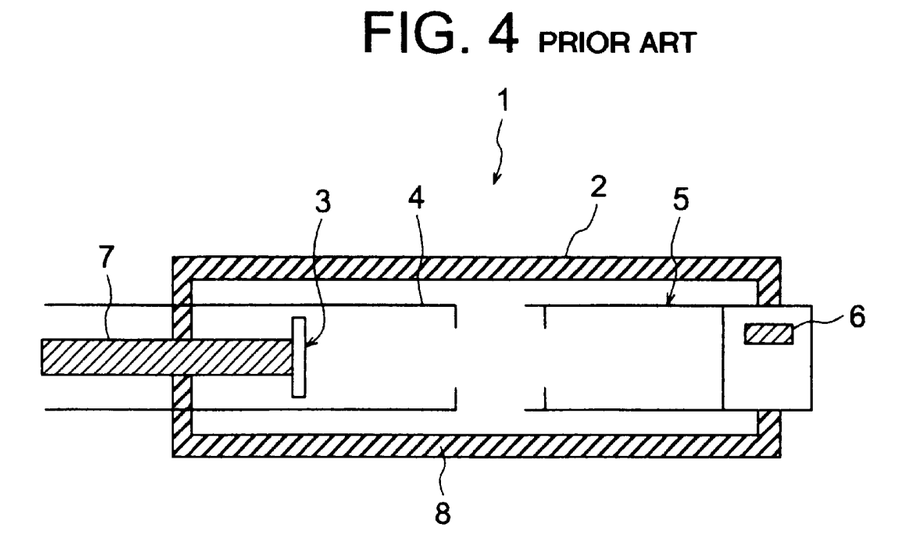
FIG. 4 is a schematic diagram showing an example of an insulating structure in a conventional neutron tube.

As shown in FIG. 4, a sealed neutron tube 1 includes a cylindrical housing wall 2, a target 3 absorbed Deuterium or Tritium therein inserted into the housing wall 2, an accelerating electrode 4 charged with a high voltage, and an ion source 5 for ionizing the Deuterium gas. A reservoir 6 in which Deuterium is filled is attached to the ion source 5. The target 3 is made contact through a high voltage connecting rod 7 to a high voltage power supply (not shown).

The operating principle with the sealed neutron tube 1 thus constructed will now be described. The Deuterium ions discharged in the ion source 5 are accelerated by the electric potential formed between the ion source 5 and the accelerating electrode 4 to collide with the target 3. This collision causes nuclear fusion reaction between the Tritium or the Deuterium absorbed in the target 3 and the Deuterium ions accelerated with about 100 kV, to thereby generate neutrons.

Here, in order to accelerate the Deuterium ions extracted from the ion source 5 to the accelerating electrode 4 within the sealed neutron tube 1, an accelerating voltage of around 100 kV is applied between the ion source 5 and the accelerating electrode 4 (namely, the target 3). For this reason, in a case where the ion source 5 side has a grounded electric potential, the accelerating electrode 4 must be supported on the housing wall 2 in an electrically insulated manner.

Figure 5:
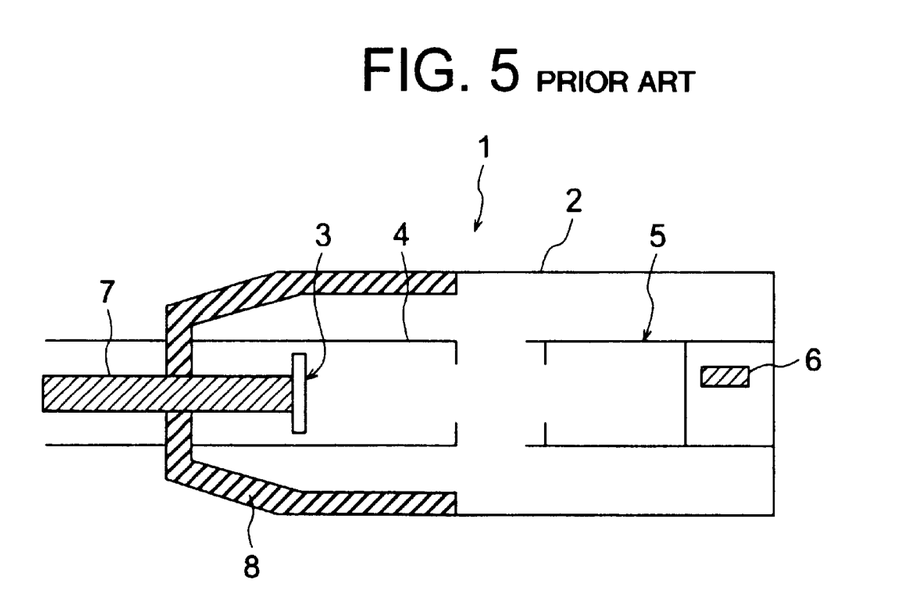
FIG. 5 is a schematic diagram showing another example of the insulating structure in the conventional neutron tube.

Therefore, as shown in FIG. 4, the housing wall 2 of the sealed neutron tube 1 is constructed by an insulating member 8 formed of a ceramic or glass, and the accelerating electrode 4 (namely the target 3) and the ion source 5 are supported by this housing wall 2 to provide an insulating structure. In FIG. 5, an alternative insulating structure for the sealed neutron tube 1 is shown, in which only a part of the housing wall 2 (i.e., an accelerating electrode 4 side of the housing wall 2) is constructed by the insulating member 8 formed of ceramic or glass to insulate the accelerating electrode 4 from the housing wall 2.

Moreover, secondary electrons are emitted from the target 3 upon the collision of the Deuterium ion beam, extracted and accelerated from the ion source 5, with the target 3. These secondary electrons are attracted to a grounded electric potential portion, such as the ion source 5, due to the electric potential existing between the ion source 5 and the accelerating electrode 4. Since a current which flows due to this secondary electron emission results in a loss of energy which does not contribute to the generation of neutrons, a structure is required to suppress the secondary electrons emitted from the accelerating electrode 4.

Hence, as shown in FIG. 4, in order to suppress the secondary electrons emitted from the accelerating electrode 4, a Faraday cap structure for the accelerating electrode 4 is accommodated in the sealed neutron tube 1. That is, the target 3 is enveloped by the accelerating electrode 4, and the electric potential of the accelerating electrodes 4 is less than that of the target 3 by about 500 to 2000 V. With the Faraday cap structure constructed in this manner, the ion beam is collided to the target 3 while being accelerated by the electric potential formed between the ion source 5 and the accelerating electrode 4, whereas the secondary electrons are returned to the target 3 side by the electric potential formed between the accelerating electrode 4 and the target 3 and are suppressed to be released toward the ion source 5 side.

Figure 6:
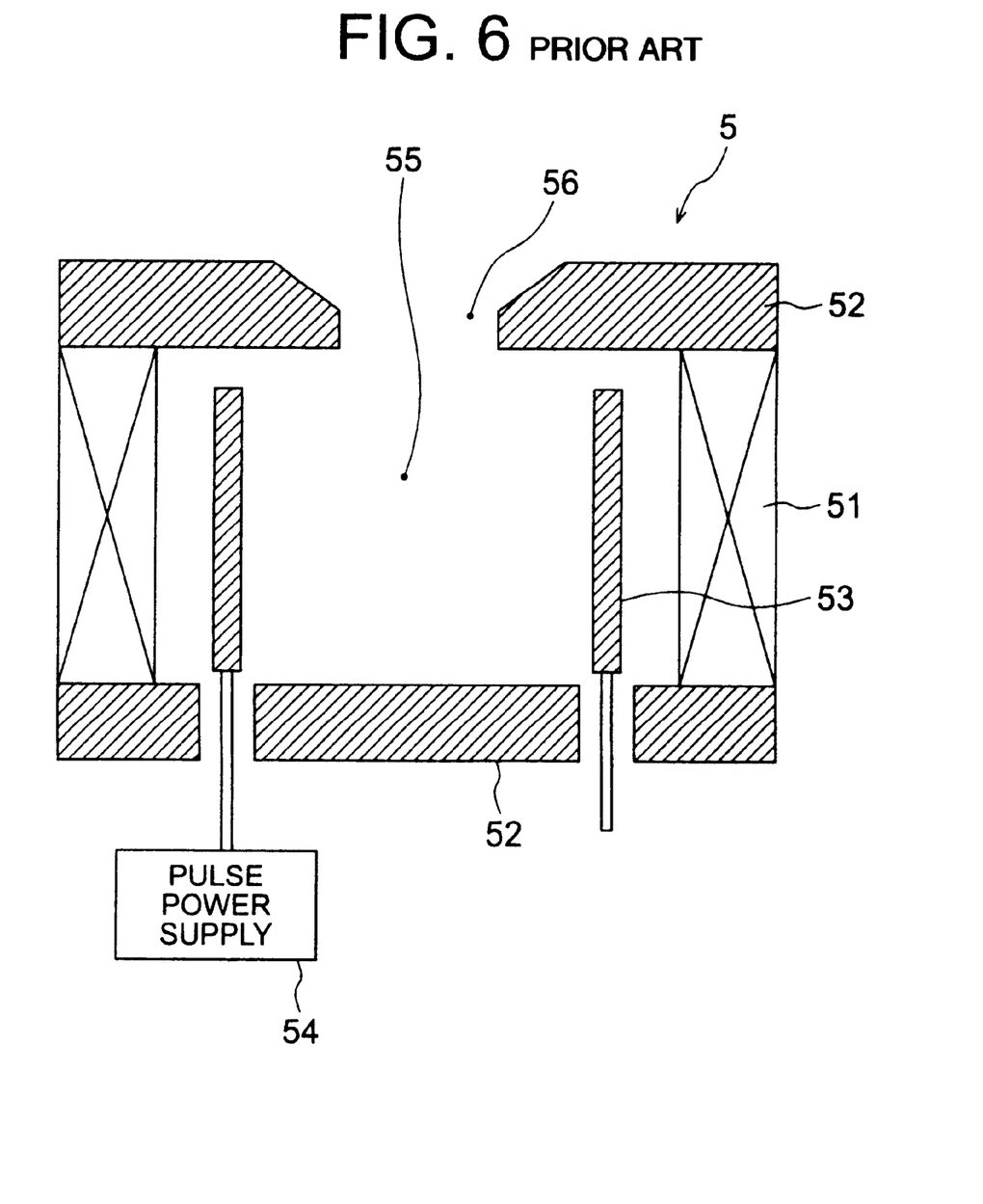
FIG. 6 is a schematic diagram showing an example of a conventional ion source in which a cylindrical magnet is used.

Next, an example of a cold cathode type ion source will be described with reference to FIGS. 6 and 7. FIG. 6 illustrates an example of the ion source 5 using a cylindrical magnet 51. The ion source 5 includes cathodes 52 attached to the ends of the cylindrical magnet 51, and a cylindrical anode 53 disposed among the cathodes 52. A plasma generating section 55 is defined in a space enveloped by the magnet 51, the cathodes 52 and the anode 53. The cylindrical anode 53 is connected to a pulsed power supply 54. An ion outlet hole 56 is disposed at the cathode 52 where the ion source 5 faces the target 3.

The generating principle of plasma with the ion source 5 thus constructed will now be described. Initially, a magnetic potential is formed in the axial direction by the magnet 51 within the ion source 5 and a voltage of 1 to 3 kV is applied to the anode 53. Next, the temperature of the reservoir 6 (see FIG. 4) in which the Deuterium is absorbed is subsequently raised to increase the gas pressure within the sealed neutron tube 1 to about $10^{-3}$ to $10^{-2}$ mmHg. As a result, plasma is generated in the plasma generating space 55 within the ion generating source 5 by the synchronized action of the electric potential formed by the anode 53 and the cathodes 52 and the magnetic potential formed by the magnet 51. The positive ions in the plasma generated in the plasma generating space 55 is extracted out of the ion outlet hole 56 by the electric potential formed between the ion source 5 and the accelerating electrode 4 (see FIG. 4). The positive ions thus extracted of the ion outlet hole 56 form the ion beam and collide with the target 3 (see FIG. 4). In addition, in order to generate the neutrons in a pulse-shaped manner, the plasma is intermittently generated within the ion source 5. To this end, the pulse power supply 54 applies the pulsed voltage to the anode 53 of the ion source 5.

Figure 7:
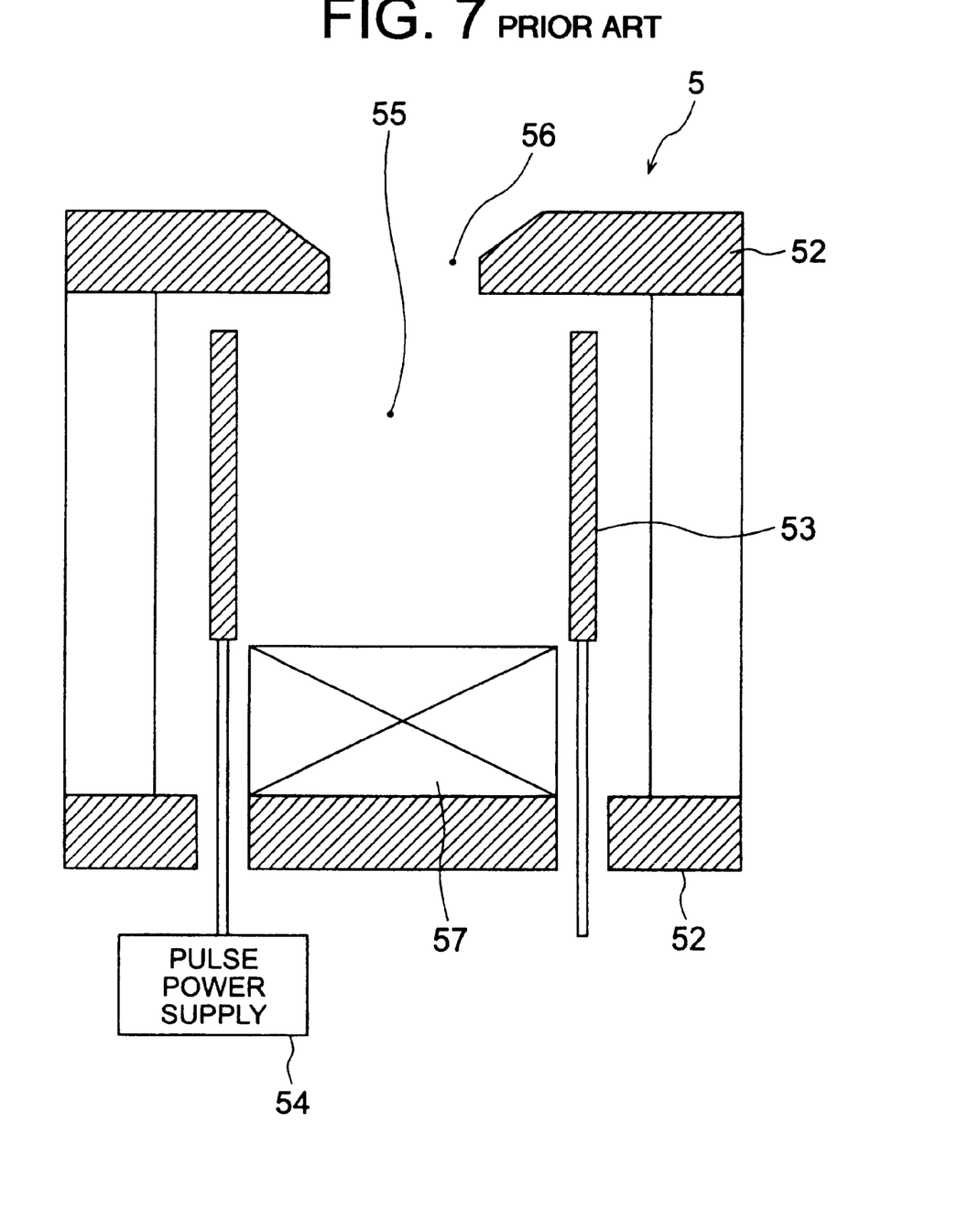
FIG. 7 is a schematic diagram showing another example of the conventional ion source in which a rod type magnet is used.

FIG. 7 illustrates an example of the ion source 5 using a rod type magnet 57 as the magnet forming the magnetic potential. In this example as well, the pulsed voltage is applied from the pulsed power supply 54 to the anode 53 of the ion source 5 to intermittently generate the plasma within the ion source 5, thereby generating neutrons in a pulse-shaped manner.

Figure 8:
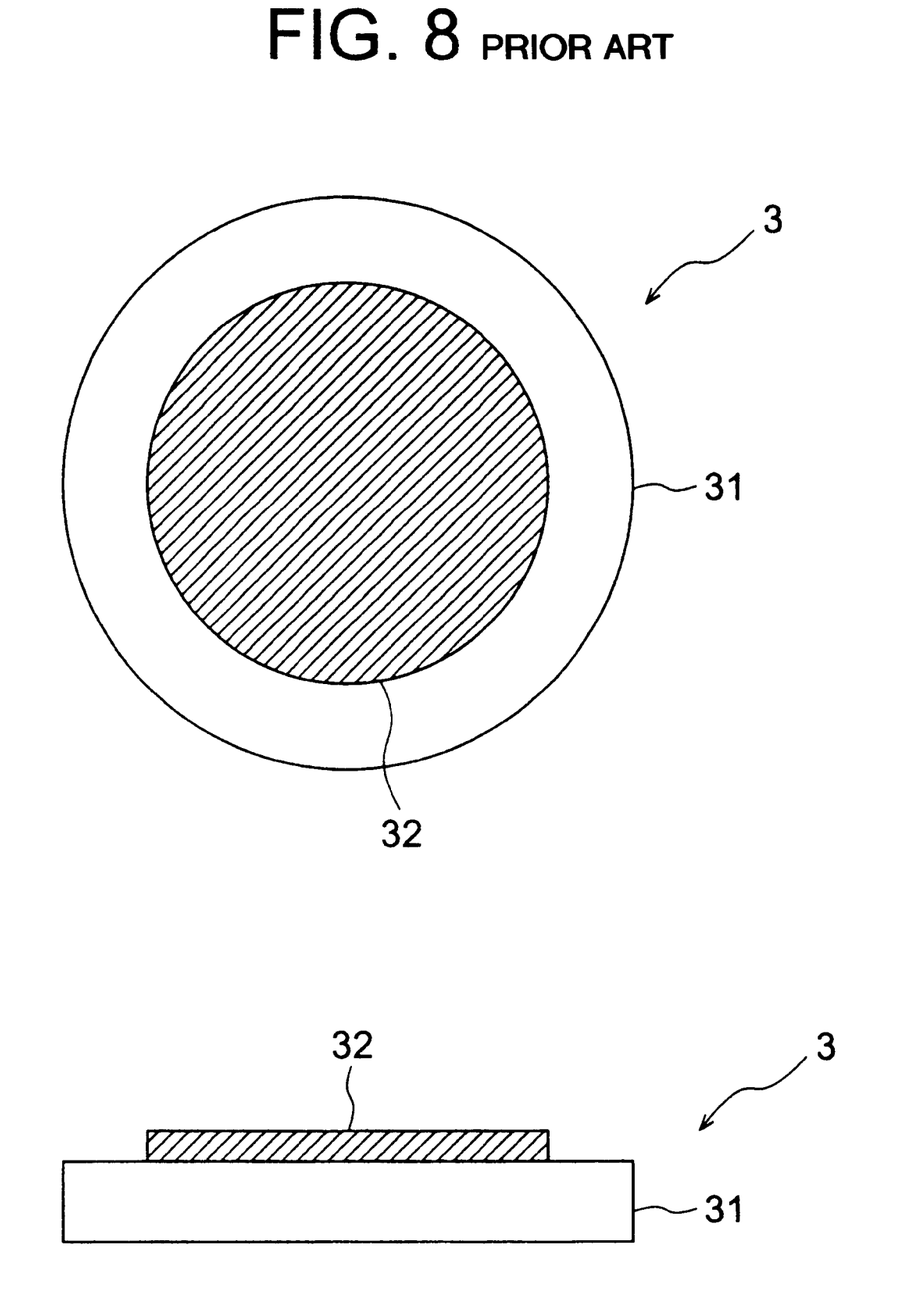
FIG. 8 is schematic plan and side views showing an example of a conventional target.

Next, the target 3 which is generally used, will be described with reference to FIG. 8. The target 3 includes a coin-like metal base 31 and a film of metal absorbing hydrogen 32 coated on the metal base 31 by processing such as sputtering the metal absorbing hydrogen. The film of metal absorbing hydrogen 32 is coated entirely on one side of the metal base 31, or circularly coated on the one side of the metal base 31. The thickness of the film of metal absorbing hydrogen 32 is about a uniform 1 to 10 μm.

The sealed neutron tube to be used for oil well logging requires high shock-proof performance because it operates in a bore hole. The sealed neutron tube 1, however, has a problem in that the insulating housing wall 2 used, which is formed by an insulating member 8 of glass or the like, has insufficient shock-proof performance. In the case of the housing wall 2 formed by an insulating member 8 of ceramic, the ceramic may be dielectrically broken down and perforated by shocks, such that the sealed neutron tube 1 breaks down. Further, the damage to the housing wall 2 will result in leakage of the internally sealed tritium (a radioactive isotope) out of the sealed neutron tube 1. That is, not only does the sealed neutron tube 1 break down, but a serious problem is also caused in safety handling. Therefore, there has been a demand to form the insulating structure of the sealed neutron tube 1 as a firmer structure having sufficient shock-proof properties, and in particular, as such a structure which prevents the Tritium from being externally leaked even if the sealed neutron tube 1 is damaged.

The pulsed neutron generating method adopted for the ion source 5 depends on turning on and off the voltage applied to the anode 53 using the pulse power supply 54. Therefore, it has been known that there is a slight time lag between the application of the voltage to the anode 53 with the pulse power supply 54 turned on and the stabilized generation of the plasma in the plasma generating section 55. This time lag in the sealed neutron tube 1 is about 3 to 10 micro seconds. In contrast, when an inelastic scattering γ-ray is analyzed in oil well logging, as the generated pulse width and pulse shape of the neutron beam generated in the pulse-shaped manner becomes shorter and more accurate, respectively, the accuracy of the logging used pulsed neutron becomes higher. Therefore, the sealed neutron tube 1 used for the oil well logging requires an ion source that is driven at a high speed in order to shorten the interval of the pulse rate of the neutron burst.

Since the target 3 is irradiated by the Deuterium ions and the like extracted from the ion source 5, the film of metal absorbing hydrogen 32 coated on the target 3 may be eroded due to the sputtering effect of the ion beam. Therefore, protection against the shortening lifetime of the target 3 due to this erosion is necessary.

It is conceivable, as a solution to protect against shortening lifetime, to make the film of metal absorbing hydrogen of the target 3 more thick, thereby making the lifetime of the film of metal absorbing hydrogen long. However, since the film of metal absorbing hydrogen in an amount substantially proportional to the increased amount of metal absorbing hydrogen, it is necessary to increase the filling amount of the Deuterium and Tritium in proportion to the thickness of the film of metal absorbing hydrogen 32.

For example, in a case where Ti is used as the metal absorbing hydrogen, the metal absorbing hydrogen Ti can absorb the hydrogen isotopic element (i.e., Deuterium and Tritium in the case of the sealed neutron tube) in a ratio substantially equal to the atomic ratio of the Ti and the hydrogen isotopic element (Ti:hydrogen isotopic element= 1:1.8). Accordingly, if the target is 10 μM thick and 12 mm in diameter, the weight of the metal absorbing hydrogen Ti is 2.7 mg, which corresponds to $5.6 \times 10^{-5}$ mol, and therefore there is a possibility that the Tritium and Deuterium will be absorbed at $10.1 \times 10^{-5}$ mol, that is, 1.8 times the weight. Assuming that the Tritium shares ½ of the amount absorbed into the target 3, this corresponds to 1.5 Ci ($5.6 \times 10^{10}$ Bq).

In contrast, from the standpoint of the waste disposal problem encountered after the sealed neutron tube 1 is used, it is desirable that the amount of Tritium, a radioactive base, used is made as small as possible. Therefore, it is desirable to lengthen the lifetime of the target without substantially increasing the amount of tritium to be absorbed.

SUMMARY OF THE INVENTION

The present invention is made in order to solve the problems encountered in the related art. Accordingly, an object of the present invention is to provide a sealed neutron tube which has higher shock-proof performance, operates at a higher pulsing rate, and has a longer lifetime.

A sealed neutron tube according to a primary aspect of the present invention includes: a metal housing; an ion source, disposed and sealed within the metal housing for ionizing a Deuterium gas; an accelerating electrode charged with a high voltage, the accelerating electrode being disposed and sealed within the metal housing so as to face the ion source; a target disposed within the accelerating electrode and absorbing Deuterium or Tritium therein; and an insulating member for insulating the target and the accelerating electrode from the metal housing, wherein Deuterium ions produced by the ion source are accelerated by an electric potential formed in a space between the ion source and the accelerating electrode to collide with the target; wherein nuclear fusion reaction is caused between the Deuterium ions and the Tritium or the Deuterium absorbed in the target, to thereby generate neutrons; and wherein a magnet is disposed within the accelerating electrode so that secondary electrons generated due to the collision of the Deuterium ions with the target are prevented from leaking out of the accelerating electrode.

It is preferable that the insulating member is disposed between a high voltage connecting rod contacted to the target, and the metal housing. It is desirable that the magnet is disposed within the accelerating electrode in such a manner as to cylindrically envelope the target.

The sealed neutron tube according to another aspect of the present invention is characterized in that the ion source has a magnet and a pair of electrodes one of which has an ion outlet hole facing the accelerating electrode, plasma is generated within the ion source by the synchronized action of a magnetic potential formed by the magnet and an electric potential formed by the pair of electrodes so that ions of the plasma are extracted from the ion outlet hole, a slit structure in which a plurality of metal plates alternately connected electrically to a pulsed power supply and a ground are fixed in parallel to one another is disposed in the vicinity of the ion outlet hole facing the accelerating electrode so that the ions extracted from the ion outlet hole are interrupted in synchronism with the pulsed power supply.

It is preferable that one of the electrodes be formed of a cathode or cathodes, the other electrode be an anode, and the ion source is a cold cathode type ion source. It is also preferable that the magnet be cylindrical, with cathodes disposed on both ends of the cylindrical magnet, the ion outlet hole disposed at the cathode facing the accelerating electrode, and the anode disposed in a cylindrical manner within the cylindrical magnet and connected to a DC power supply.

The sealed neutron tube according to yet another aspect of the present invention is characterized in that the target includes a coin-like metal base, and a film of metal absorbing hydrogen formed on the metal base, and a thickness of the film of metal absorbing hydrogen is varied in proportion to the beam density of the Deuterium ions collided onto the target.

It is preferable that the thickness of the film of metal absorbing hydrogen is increased from a peripheral portion of the metal base toward a central portion thereof. In particular, it is more preferable that the film of metal absorbing hydrogen has such a multi-layered structure such that layered portions of the film of metal absorbing hydrogen are made with consecutively smaller diameters.

In the sealed neutron tube according to the present invention, since the housing wall is constructed by the metal tube and the accelerating electrode is held within this metal tube by the provision of the ceramic insulating member, the outer wall (the side wall) of the sealed neutron tube has increased shock-proof performance and the sufficiently thick ceramic ensures the insulating performance. Consequently, the sealed neutron tube of the invention can be used under severer vibration and shock conditions than conventional neutron tubes. Moreover, with this type of insulating and supporting structure, it is difficult to apply an electric potential between the accelerating electrode and the target to prevent emission of the secondary electrons. Therefore, in the present invention, a permanent magnet is disposed within the accelerating electrode to provide a magnetic potential (a lateral magnetic potential) between the target and the inlet of the accelerating electrode in place of providing the electric potential. Consequently, the track of the secondary electrons emitted from the target is bent, and thus the secondary electrons are prevented from leaking out of the accelerating electrode.

For high pulsing rate operation of the ion source, a plurality of parallelly arrayed metal plates electrically alternately connected to a pulsed power supply and a ground are arranged in the vicinity of the ion outlet hole 56 so as to provide a slit structure, whereas the DC voltage is applied to the anode of the ion source so that plasma is constantly generated. The change in the electric potential formed by the slit structure disposed in the vicinity of the ion outlet hole makes it possible to vary the direction of the ion beam emitted from the ion source toward the target, thereby pulsating the ion beam incident on the target. That is, depending on the state of the electric potential in the slit structure, the direction of the motion of the ions is made linear so that the ion beam is incident on the target, or otherwise bent laterally at 90 degree so that the ion beam to the target is interrupted. According to this method, although the time period required to charge the slit structure may be a cause of time-delay of the pulse, the charging time can nevertheless be shortened remarkably, and therefore a higher pulsing rate operation can be realized compared to the method in which the plasma of the ion source is turned on and off. Consequently, the sealed neutron tube of the invention can generate neutrons as a neutron pulse having an accurate pulse-shape with a pulse width of less than 1 micro second, which is difficult to generate with the conventional neutron tube, as well as continuously generate neutrons.

To lengthen the lifetime of the target, a target is used such that the thickness of the film of metal absorbing hydrogen is varied in proportion to the beam density in view of the fact that the erosion of the film of metal absorbing hydrogen on the target is proportional to the ion beam density onto the film of metal absorbing hydrogen. With this structure, the erosion cycle of the film of metal absorbing hydrogen can be made entirely uniform from the central portion of the film of metal absorbing hydrogen to the peripheral portion thereof. Therefore, the performance thereof is not lowered until the film of metal absorbing hydrogen is eroded completely. That is, the most efficient use can be offered with respect to the metal absorbing hydrogen of the same amount as the conventional amount. Consequently, a stabilized target performance can be obtained with a lower sealing amount of tritium until the target is eroded completely.

DETAILED DESCRIPTION OF THE PREFERRED EMBODIMENTS

Referring to the accompanying drawings, a description will be given of the preferred embodiment of the present invention which the inventor believes to be the best mode at present.

In the following description and accompanying drawings, the same or functionally equivalent component parts are denoted by the same reference numerals. Note that the terms "right", "left", "up", "down" and the like are used in the following description simply for the sake of convenience, and the present invention should not be interpreted restrictively by these terms.

Figure 1:
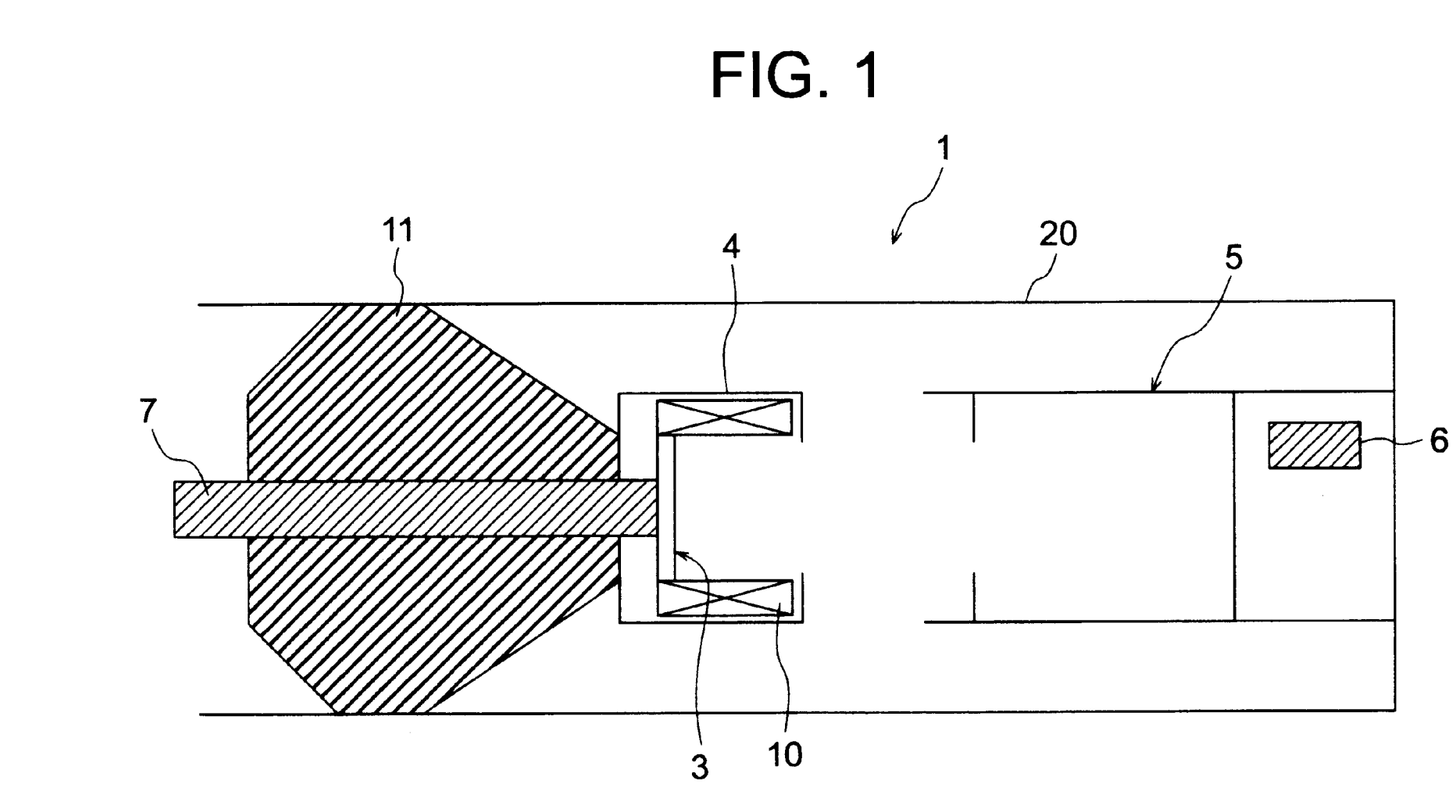
FIG. 1 is a schematic diagram showing a structure of a sealed neutron tube according to an embodiment of the present invention.

FIG. 1 is a schematic diagram showing a structure of a sealed neutron tube 1 according to the present invention. As illustrated, the sealed neutron tube 1 is provided with a metal housing 20 as an outer wall. Within the metal housing 20, an ion source 5 for ionizing the Deuterium gas, an accelerating electrode 4 charged with high voltage, a target 3 in which Deuterium or Tritium is absorbed, and an insulating member 11 for insulating the target 3 and the accelerating electrode 4 from the metal housing 20 are sealingly disposed.

Specifically, the coin-like target 3 is disposed within the accelerating electrode 4. A cylindrical magnet 10 for preventing secondary electrons is disposed within the accelerating electrode 4 to enveloped the target 3 (the function thereof will be described latter). The target 3 is connected through a high voltage introducing metal rod, i.e, a high voltage connecting rod 7, to a high voltage power supply (not shown). The ion source 5 side of the accelerating electrode 4 is open.

The insulating member 11 is disposed to support the high voltage connecting rod 7 within the metal housing 20 while surrounding the connecting rod 7. The target 3 and the accelerating electrode 4 are insulated from the metal housing 20 by the insulating member 11. The insulating member 11 is made of a ceramic. The accelerating electrode 4 is supported by the insulating member 11 and disposed substantially coaxial to the metal housing 20. Since the outer wall is formed by the metal housing and the ceramic insulating member 11 is provided within the metal housing 20 to hold the accelerating electrode 4, the outer wall (side wall) of the sealed neutron tube 1 has enhanced shock-proof properties, and the ceramic of sufficient thickness ensures insulating properties.

The ion source 5 is fixed through a reservoir 6, in which the Deuterium is filled, to the metal housing 20 so as to be substantially coaxial to the metal housing 20. Therefore, the ion source 5 and the accelerating electrode 4 are disposed so as to confront or face each other. In order to form an electric potential for accelerating the Deuterium ions radiated from the ion source 5 toward the accelerating electrode 4, application of a voltage of about 100 kV is required between the ion source 5 and the accelerating electrode 4 (namely the target 3). Accordingly, in this embodiment, the ion source 5 is used as the grounded electric potential, whereas the accelerating voltage is applied to the accelerating electrode 4, and it is further necessary that the accelerating electrode 4 is insulated from the metal housing 20. That is, since the insulating member 11 insulates the accelerating electrode 4 from the metal housing 20 as described above, the accelerating voltage forming the electric potential for accelerating the Deuterium ions drawn out of the ion source 5 can be applied between the ion source 5 and the accelerating electrode 4.

The operating principle of the sealed neutron tube 1 thus constructed is the same as that described in connection with the conventional neutron tube. The Deuterium ions produced in the ion source 5 are accelerated by the electric potential formed between the ion source 5 and the accelerating electrode 4 to collide with the target 3. This collision causes nuclear fusion reaction between the Tritium or the Deuterium absorbed in the target 3 and the Deuterium ions colliding with the target 3, to thereby generate neutrons.

Moreover, secondary electrons are emitted from the target 3 upon the collision of the Deuterium ion beam extracted and accelerated from the ion source 5 with the target 3. The insulating and supporting structure as mentioned above has difficulty in adopting the Faraday cap structure providing an electric potential between the accelerating electrode 4 and the target 3 for preventing the emission of the secondary electrons. Therefore, in this embodiment, a permanent magnet 10 is disposed within the accelerating electrode 4 to provide a magnetic potential (a lateral magnetic potential) between the target 3 and the inlet of the accelerating electrode 4 in place of providing the electric potential. Consequently, the track of the secondary electrons emitted from the target 3 is bent, and thus the secondary electrons are prevented from leaking out of the accelerating electrode 4.

Figure 2:
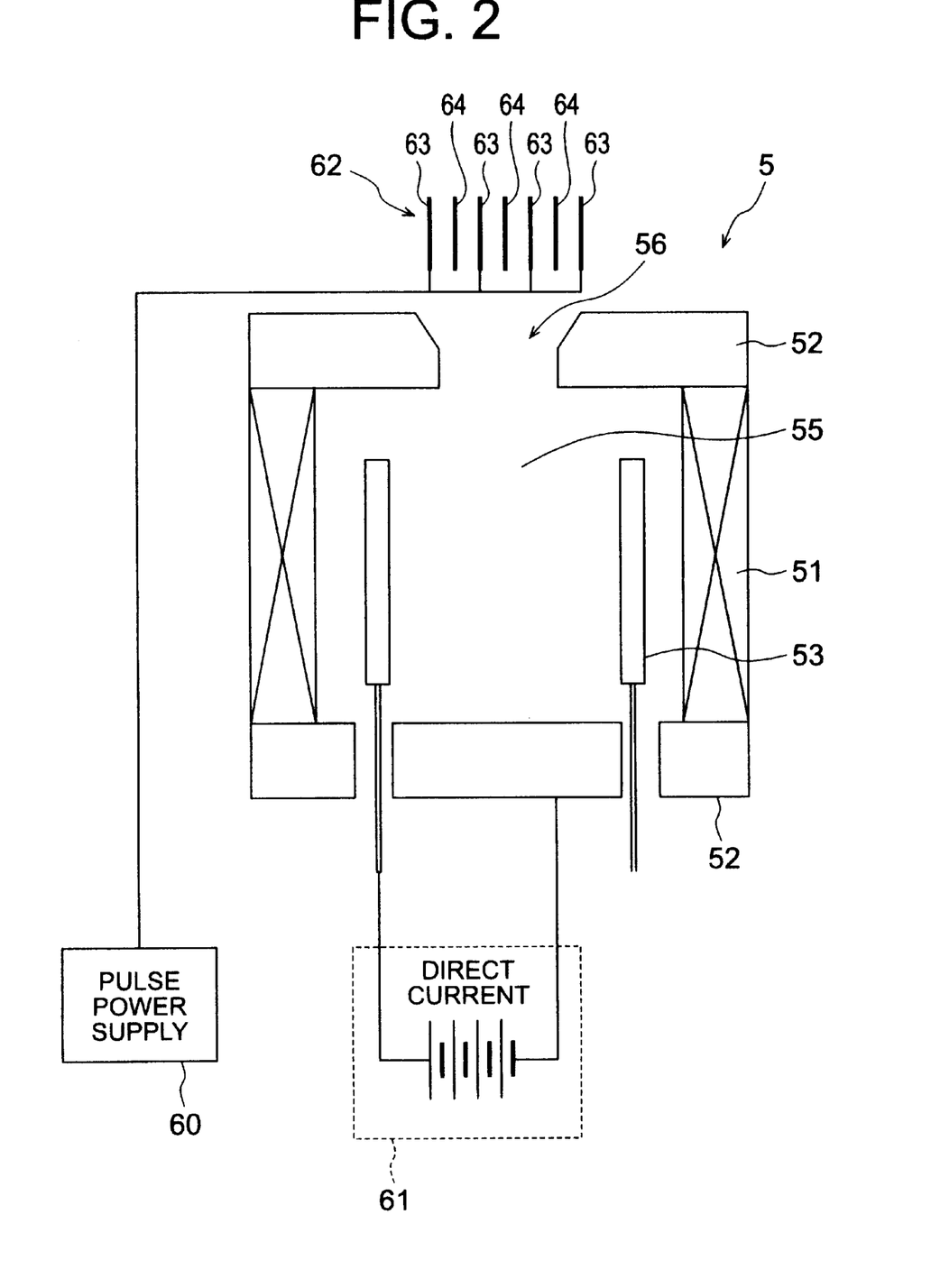
FIG. 2 is a schematic diagram showing a structure of an ion source according to the embodiment of the present invention.

Next, with reference to FIG. 2, a structure of an ion source according to the present invention will be described. FIG. 2 is a schematic diagram showing a structure of a cold cathode type ion source 5. As illustrated, the ion source 5 includes cathodes 52 attached, respectively, at the both ends of the cylindrical magnet 51, and a cylindrical anode 53 disposed between the cathodes 52. A plasma generating section 55 is defined in a space enveloped by the magnet 51, the cathodes 52 and the anode 53. The cathodes 52 and the anode 53 are connected to a DC power supply 61. An ion outlet hole 56 is provided at the cathode 52 where the ion source 5 faces the target 3. A plurality of metal plates 63 electrically connected to a pulsed power supply 60 and a plurality of electrically grounded metal plates 64 are alternately fixed in parallel at the accelerating electrode 4 side in the vicinity of the ion outlet hole 56 so as to form a slit structure 62.

The generating principle of plasma with the ion source 5 thus constructed will now be described. The magnet 51 forms the magnetic potential in the axial direction within the ion source 5, whereas the DC voltage is constantly applied by the DC power supply 61 to the anode 53 and the cathodes 52, and therefore plasma is constantly generated in the plasma generating section 55 within the ion source 5. The positive ions of the plasma generated in the plasma generating section 55 are drawn out of the ion outlet hole 56 by the electric potential formed between the ion source 5 and the accelerating electrode 4 (see FIG. 1).

In the embodiment, the change in the electric potential formed by the slit structure 62 disposed in the vicinity of the ion outlet hole 56 makes it possible to vary the direction of the ion beam emitted from the ion source 5 toward the target 3, thereby pulsating the ion beam incident on the target 3. That is, when the output voltage of the pulsed power supply 60 is 0 V, the electric potential between the metal plates 63 and 64 in the slit structure 62 are equal to each other, so that the ion beam can freely pass from the ion source 5 through gaps in the slit structure 62 toward the target 3. In contrast, when the output of the pulsed power supply 60 is positive, the electric potential between the metal plates 63 and 64 is greatly inclined so that the track of the ion beam emitted from the ion source 5 is bent toward the grounded metal plates 64, and the ion beam can not pass through the gaps in the slit structure 62 if the metal plates 63 and 64 have a sufficiently large width. That is, the extraction of the ion beam toward the target 3 is interrupted. According to this method, although the time period required for charging the slit structure 62 may be a cause for time-delay of the pulse the charging time can nevertheless be shortened remarkably, and therefore higher pulsing rate operation can be realized compared to the method in which the plasma of the ion source is turned on and off.

Figure 3:
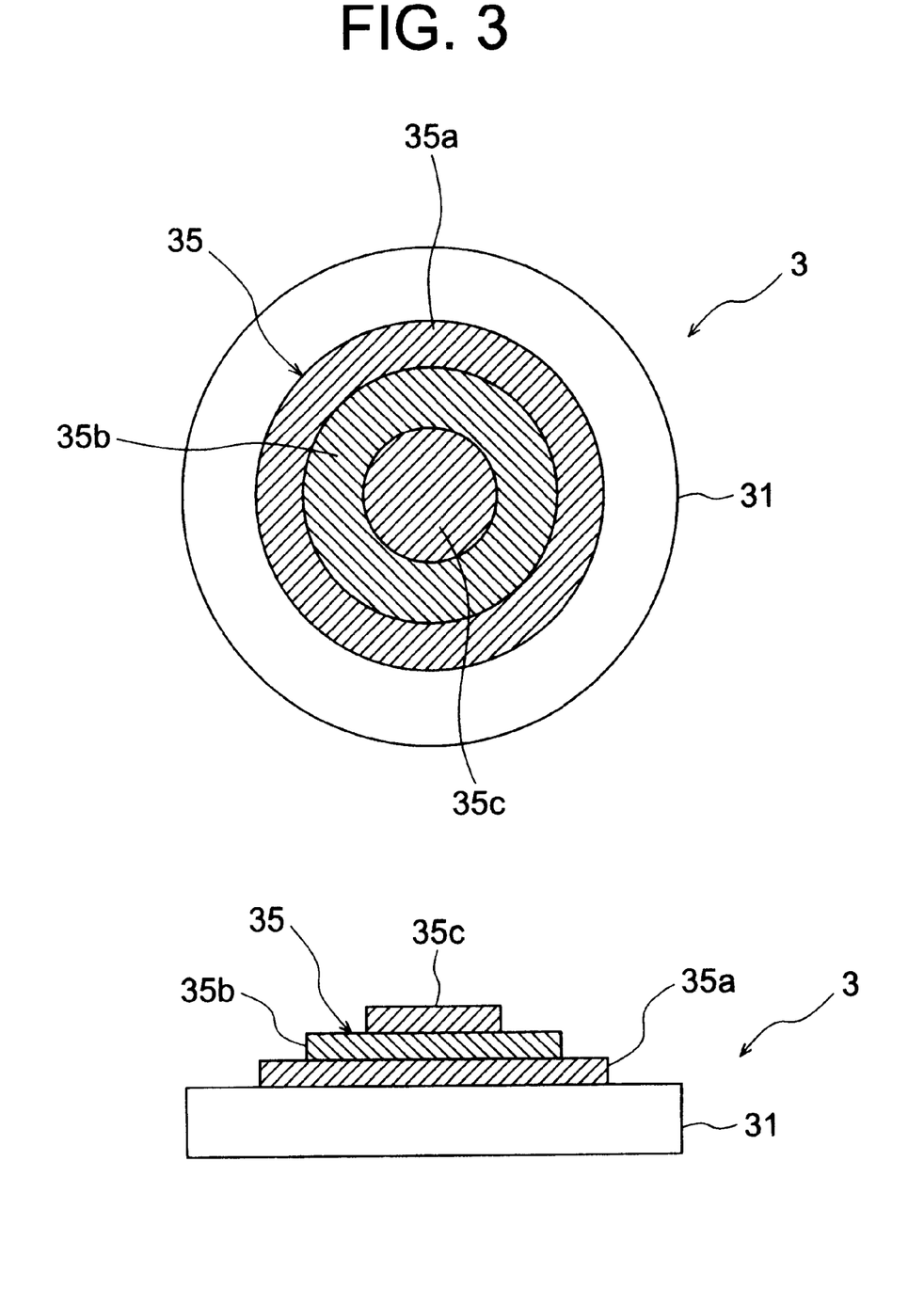
FIG. 3 is schematic plan and side views showing a structure of a target according to the embodiment of the present invention.

FIG. 3 is a schematic diagram showing a structure of a target 3 according to the present invention. As illustrated, the target 3 includes a coin-like metal base 31, and a film of metal absorbing hydrogen 35 on the metal base 31 which is formed as a thin film of the metal absorbing hydrogen by a process such as sputtering. The thickness of the film of metal absorbing hydrogen 35 is varied in proportion to the beam density of the Deuterium ion beam emitted from the ion source 5 to the target 3.

Specifically, the metal base 31 in this embodiment is a Copper base, uses Titanium as the metal absorbing hydrogen occlusion metal, and has a multi-layered structure in which a plurality of circular layers are stacked on one another on the Copper base. Since the ion beam density is larger at the central portion of the target 3 than at the peripheral portion thereof, the thickness of the film of metal absorbing hydrogen 35 is arranged to increase from the peripheral portion to the central portion. The film of metal absorbing hydrogen 35 of the multi-layered structure is formed so that a film of metal absorbing hydrogen portion 35*a* which is directly contacted the metal base 31 has a large diameter, and film of metal absorbing hydrogen portions 35*b* and 35*c* have consecutively smaller diameters as they become distanced from the metal base 31. The film of metal absorbing hydrogen 35 is formed on one side of the metal base 31, and the thickness of each film portion of the film of metal absorbing hydrogen is about a uniform 1 to 10 $\mu$m.

In the target 3 thus constructed, the erosion cycle of the film of metal absorbing hydrogen 35 due to the irradiation of the Deuterium ion beam can be made entirely equal from the central portion to the peripheral portion thereof. Therefore, the performance is not lowered until the film of metal absorbing hydrogen is worn completely. That is, the most efficient use can be offered with respect to the metal absorbing hydrogen of the same amount as the conventional amount, and the lifetime of the target 3 can be made longer.

Although the sealed neutron tube according to the present invention was described with reference to the drawings, the present invention should not be limited to this embodiment. For example, in place of the structure in which the accelerating electrode 4 is insulated from and held in the metal housing 20 by the insulating member 11 indirectly through the connecting rod 7, the accelerating electrode 4 may be insulated from and held in the metal housing 20 by the insulating member 11 directly such that the cylindrical insulating member is disposed within the metal housing 20 to enveloped the accelerating electrode 4.

Although the cold cathode type ion source is used as the ion source 5 in this embodiment, the anode 53 and the cathodes 52 may be arranged in reverse.

Although the cylindrical magnet 51 is used as the magnet for generating the magnetic potential in the ion source 5, a rod type magnet may be used as in the conventional example shown in FIG. 7.

Although the preferred embodiment of the present invention which the inventor believes to be the best mode at present, and the modifications thereof have been described with reference to the accompanying drawings, the present invention should not be limited to these embodiments and modifications. Various additional applications and modifications to a sealed neutron tube can be easily made and realized without departing from the spirit and scope of the present invention by one having ordinary skill in the art.

What is claimed is:

1. A sealed neutron tube comprising:

a metal housing;

an ion source, disposed and sealed within said metal housing, for ionizing a Deuterium gas;

an accelerating electrode charged with a high voltage, said accelerating electrode being disposed and sealed within said metal housing and facing said ion source;

a target disposed within said accelerating electrode and absorbing Deuterium or Tritium therein; and a insulating member for insulating said target and said accelerating electrode from said metal housing, wherein Deuterium ions produced by said ion source are accelerated by an electric potential formed in a space between said ion source and said accelerating electrode to collide with said target;

wherein nuclear fusion reaction is caused between said Deuterium ions and said Tritium or said Deuterium absorbed in said target, to thereby generate neutrons; and wherein a magnet is disposed within said accelerating electrode so that secondary electrons generated due to the collision of said Deuterium ions with said target are prevented from leaking outside of said accelerating electrode.

2. The sealed neutron tube according to claim 1, wherein said insulating member is disposed between a high voltage power supply connecting rod adjacent to said target, and said metal housing.

3. The sealed neutron tube according to claim 1, wherein said magnet is disposed within said accelerating electrode in a cylindrical manner so as to envelop said target.

4. The sealed neutron tube according to claim 1, wherein the ion source comprises:

an ion source magnet;

a pair of ion source electrodes, one of said electrodes having an ion outlet hole facing said accelerating electrode;

a plasma generation section, wherein a plasma is generated by synchronized action of the magnetic potential formed by said ion source magnet and an electric potential formed by said pair of ion source electrodes so that ions of said pair of said plasma are extracted from said ion outlet hole; and a slit structure, wherein a plurality of metal plates alternately connected to an electrical pulsed power supply and a ground are fixed in parallel, said slit structure disposed in the vicinity of said ion outlet hole and facing said accelerating electrode so that ions extracted from said ion outlet hole can be interrupted in synchronism with said pulsed power supply.

5. The sealed neutron tube according to claim 4, wherein one of said ion source electrodes is at least one cathode and the other is an anode, and said ion source is a cold cathode type ion source.

6. The sealed neutron tube according to claim 5, wherein said ion source magnet is cylindrical, one of said cathodes is disposed at each end of said cylindrical ion source magnet, said ion outlet hole is disposed at the cathode that faces said accelerating electrode, and said anode is disposed in a cylindrical manner within said cylindrical ion source magnet and connected to a DC power supply.

7. The sealed neutron tube according to claim 1, wherein said target includes a coin-like base, and a film of metal absorbing hydrogen formed as a film of a metal absorbing hydrogen on said base, and a thickness of said film of metal absorbing hydrogen is varied in proportion to a beam density of said Deuterium ions irradiated onto said target.

8. The sealed neutron tube according to claim 7, wherein the thickness of said film of metal absorbing hydrogen is increased from a peripheral portion of said metal base toward a central portion thereof.

9. The sealed neutron tube according to claim 8, wherein said film of metal absorbing hydrogen has a multi-layered structure such that layered portions of said film of metal absorbing hydrogen have consecutively smaller diameters from a central portion to the peripheral portion of said metal base.

* * * * *